Ralph L. Hughes
INVENTOR.

United States Patent Office 3,072,884
Patented Jan. 8, 1963

3,072,884
AUTOMOBILE ALARM SYSTEM
Ralph L. Hughes, 6014 S. Croft Ave., Los Angeles, Calif.
Filed Nov. 2, 1959, Ser. No. 850,253
4 Claims. (Cl. 340—52)

This invention relates to headlight reminder alarm systems for motor vehicles and has for its purpose the operation of an alarm indicating device to remind the motor vehicle operator to turn the vehicle's headlights on before driving at night.

A further purpose of this invention is to operate the alarm indicating device to remind the vehicle operator to turn the vehicle's headlights off whenever the vehicle is parked, either in daylight or in darkness, with its motor turned off and its headlights left on.

A further purpose of this invention is to provide means for automatically shutting off the alarm indicating device when the vehicle's motor is running and the headlights are turned on and also when the vehicle's motor is not running and its headlights are turned off.

Further features of this invention and further objects to be attained will be described in the following specification. It is to be understood that the invention resides mainly in the alarm indicating device and current limiting electrical resistor as connected in electrical series between an electrical circuit of the motor vehicle that is normally electrically energized whenever the vehicle's motor is in operation and the vehicle's headlights circuit, and with an electrical grounding switch, whose contacts are normally open only when the vehicle is in operation, connected to a point between the alarm indicating device and the current limiting electrical resistor as described and shown in the specification and drawings and as claimed; the description of several applications of this headlight reminder alarm system is not intended to be limitive, but rather to show, by a few examples, how this combination of alarm indicating device, current limiting resistor and grounding switch can be used in a headlight reminder alarm system. Many changes, especially with regard to specific details mentioned may, therefore, be made without departing from the essence of the invention.

More specific objects and features of this invention will become apparent from the following description when considered in connection with the accompanying drawings, in which—

FIGURE 1 is a drawing of the headlight reminder alarm circuit comprising an electrical alarm indicating device and a current limiting electrical resistor in electrical series connection between the low oil pressure alarm circuit and the headlights circuit of the motor vehicle, with the alarm indicating device also connected between the headlights circuit and a grounding switch whose contacts are normally open only when the vehicle's motor is running. This grounding switch may, if desired, be a part of and operated by the motor vehicle's low oil pressure switch.

FIGURE 2 is a drawing of a headlight reminder alarm circuit similar to that of FIGURE 1, but with the current limiting resistor connected directly between the two terminals of a double pole-single throw grounding switch that may also be used for the low oil pressure alarm switch of the motor vehicle, if desired.

FIGURE 3 is a drawing of a headlight reminder alarm circuit showing an alarm indicating device and a current limiting resistor connected in electrical series between the headlights circuit and the armature circuit of the vehicle's electrical generator, with the alarm indicating device also connected between the headlights circuit and a grounding switch that is normally open only when the vehicle is in operation.

FIGURE 4 is a drawing of a headlight reminder alarm circuit similar to that of FIGURE 3, but with the motor vehicle's generator indicator lamp connected between the current limiting resistor and the vehicle's electrical generator.

FIGURE 5 is a drawing of a headlight reminder alarm circuit showing the alarm indicating device and current limiting electrical resistor connected in electrical series between the headlights circuit and the ignition circuit of a motor vehicle, with the alarm indicating device also connected between the headlights circuit and a grounding switch that is normally open only when the vehicle is in operation.

FIGURE 6 is a drawing of a headlight reminder alarm circuit of an electrical motor operated vehicle showing the alarm indicating device and a current limiting electrical resistor connected in electrical series between the headlights circuit of the motor vehicle and a circuit that is electrically energized only when the motor operating switch is closed, with the alarm indicating device also connected between the headlights circuit and a grounding switch that is normally open only when the vehicle is in operation.

Figure 7:
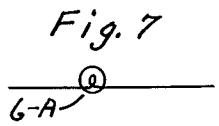
FIGURE 7 is a drawing of an electric lamp that may be used as the alarm indicating device in FIGURES 1, 2, 3, 4, 5 and 6.
Figure 8:
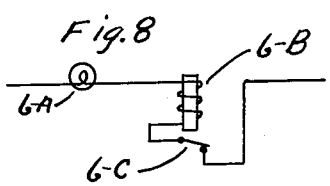
FIGURE 8 is a drawing of an electric lamp and an electrical buzzer connected in electrical series, as may be used for the alarm indicating device in FIGURES 1, 2, 3, 4, 5, and 6.
Figure 9:
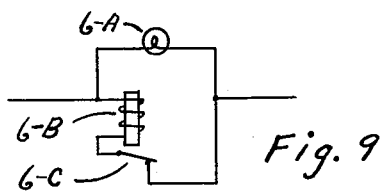
FIGURE 9 is a drawing of an electric lamp and an electrical buzzer connected in electrical parallel, as may be used for the alarm indicating device in FIGURES 1, 2, 3, 4, 5 and 6.

This electric lamp, as shown in FIGURES 7, 8 and 9, may be of the ordinary automobile instrument panel type lamp, if desired, or it may be of the blinking or flashing type that momentarily opens and closes its filament circuit when energized to produce the flashing light.

The invention consists of an alarm indicating circuit composed of an electrical alarm indicating device and a current limiting electrical resistor connected in electrical series between an electrical circuit of a motor vehicle that is normally electrically energized only when the vehicle is in operation and the headlights circuit of the motor vehicle, with the alarm indicating device also connected between the headlights circuit and an automatically operating grounding switch that is normally open only when the vehicle is in operation.

Figure 4:
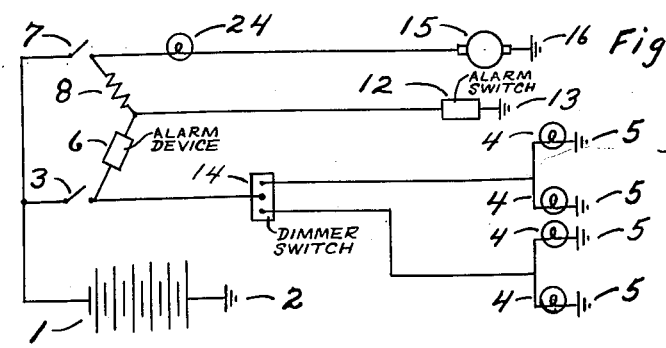
Figure 5:
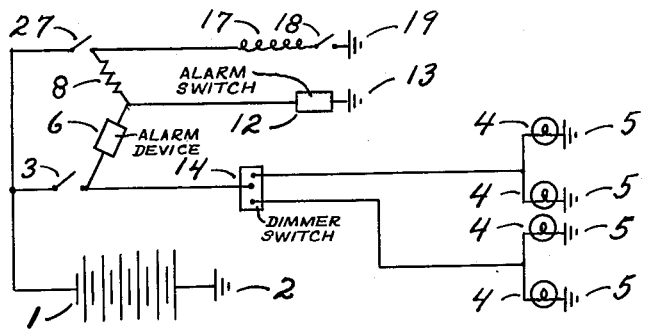
Figure 6:
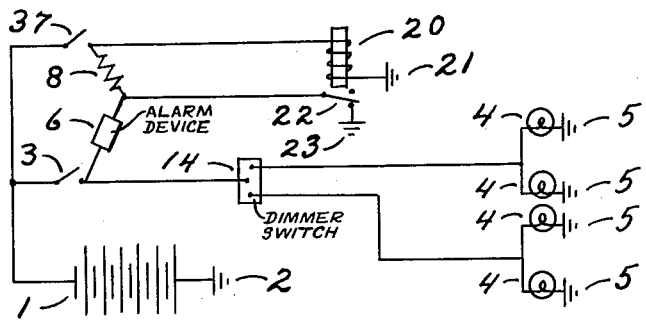

This normally closed grounding switch may, if desired, be operated by the vehicle's motor oil pressure to open its contacts when the oil pressure is normal as in FIGURES 1, 2, 3, 4, and 5; or it may be an electrical relay that becomes energized and opens its normally closed contacts whenever the vehicle's motor operating switch is closed as in FIGURE 6.

Figure 1:
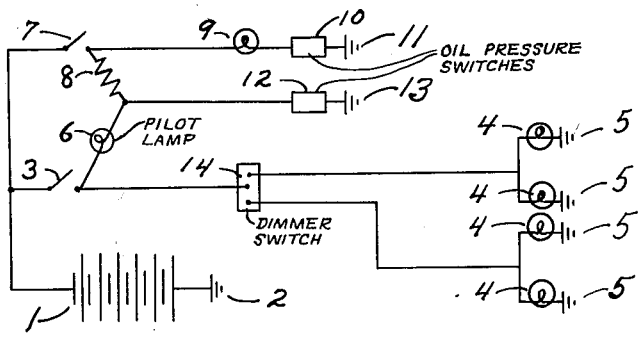

The headlight reminder alarm system as shown in FIGURE 1 consists of an alarm indicating device 6 and a current limiting electrical resistor 8 connected in electrical series between the headlights switch 3 and the electrical switch 7 that energizes the low oil pressure alarm indicating lamp 9 and low oil pressure switch 10, with an oil pressure operated switch 12 connected to the grounded frame at 13 and to a point between the alarm indicating device 6 and the resistor 8. If desired, the two low oil pressure grounding switches 10 and 12 may be combined into one double pole-single throw grounding switch as in FIGURE 2.

Figure 2:
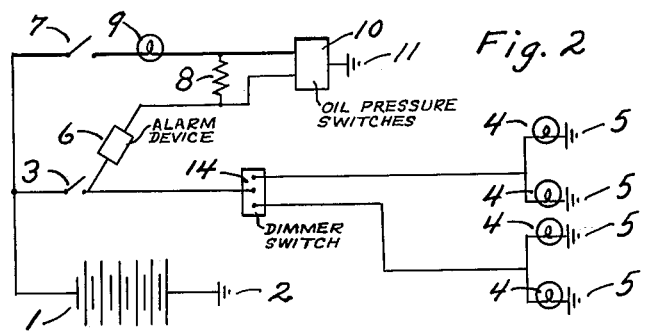

As shown in FIGURE 2 the headlight reminder alarm system may consist of the alarm indicating device 6 and the resistor 8 connected between the headlights circuit and the low oil pressure alarm circuit with the resistor 8 connected directly between the terminals of a double-pole, single-throw grounding switch 10 that may be a low oil pressure alarm switch with an extra circuit terminal for the headlight reminder alarm circuit.

Figure 3:
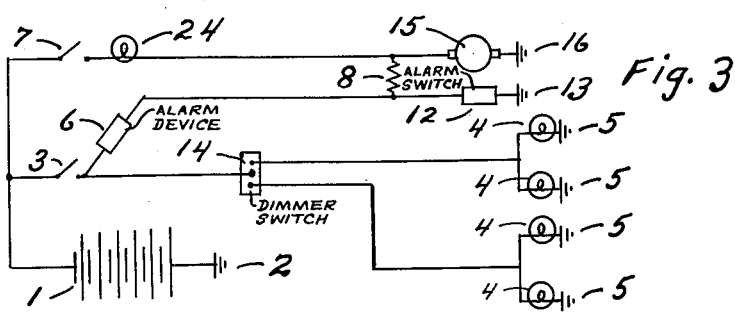

As shown in FIGURE 3 the alarm indicating device 6 and the resistor 8 may be connected in electrical series between the headlights circuit and the armature 15 of the vehicle's electrical generator with a grounding switch 12 connected to a point between the alarm indicating device 6 and the resistor 8.

As shown in FIGURE 4 the alarm indicating device 6 and the resistor 8 may be connected in series between the headlight circuit and a generator no-charge indicator lamp circuit of the motor vehicle, with the generator no-charge indicator lamp 9 connected between the resistor 8 and the armature 15 of the motor vehicle's electrical generator. The grounding switch 12 is connected to a point between the alarm indicating device 6 and the resistor 8.

As shown in FIGURE 5 the alarm indicating device 6 and the resistor 8 may be connected in series between the headlights circuit and the ignition coil 17 of the motor vehicle, with the grounding switch 12 connected to a point between the alarm indicating device 6 and the resistor 8.

As shown in FIGURE 6 the alarm indicating device 6 and the resistor 8 may be connected in series between the headlights circuit and a circuit that is energized whenever the vehicle is in operation. A grounding switch 22 is connected to a point between the alarm indicating device 6 and the resistor 8. A relay operating coil 20 that, when energized, opens the grounding switch 22, may also be connected to a circuit that is energized whenever the vehicle is in operation.

The operation of the headlight reminder alarm system when connected to a motor vehicle as shown in FIGURE 1 is as follows:

When the operator closes the ignition switch to start the vehicle's motor the electrical switch 7 also closes and energizes the low oil pressure indicator lamp 9 through the closed oil pressure switch 10, grounded connections 11 and 2 and the battery 1 of the motor vehicle. This lights up the lamp 9. An electrical current will also flow from the battery 1, through switch 7, the current limiting resistor 8 and the grounding switch 12 to the battery 1 again through the grounded connections 13 and 2.

As soon as the vehicle's motor is running its oil pump will raise the oil pressure and cause the grounding switches 10 and 12 to open. This causes the lamp 9 to go out and causes a small electrical current to flow from the battery 1 through switch 7, resistor 8, alarm indicating device 6, headlights dimmer switch 14 and the headlight lamps 4 to the battery 1 again through the grounded connections 5 and 2. This small electrical current through the alarm indicating device 6 produces a weak or dim light in the lamp 6–A, FIGURES 7, 8 or 9, of the alarm indicating device 6 that is too dim to be noticeable in bright daylight. However, when the vehicle is operated at night the dim light of lamp 6–A appears much brighter and serves to remind the operator to turn on the vehicle's headlights. When the headlights switch 3 is then closed an equal voltage of the same polarity is impressed across the alarm device 6 and the resistor 8 and since the grounding switch 12 is now open no current will flow through the alarm device 6 so its light goes out.

When the switch 7 is opened by opening the motor vehicle's ignition switch to stop its motor, a large electrical current will flow from the battery 1, through the headlights switch 3, alarm indicating device 6, grounding switch 12 (which is now closed, since the vehicle's motor has stopped) and to the battery 1 through the grounded connections 13 and 2. This large current through the lamp 6–A, FIGURES 7, 8 or 9, of the alarm device 6 produces a bright light in the lamp 6–A that serves to remind the operator to turn off the vehicle's headlights before leaving the parked vehicle. When the headlights switch 3 is then opened the light of alarm device 6 goes out.

An electrical buzzer 6–B may be connected in series with the lamp 6–A, as shown in FIGURE 8, or in parallel, as shown in FIGURE 9, if desired, in the alarm indicating device 6 to sound an audible alarm in addition to the bright light of lamp 6–A to remind the operator to turn off the vehicle's headlights when its motor is not in operation. This buzzer 6–B will not operate its alarm sounding armature 6–C to sound an alarm when the vehicle is operated without its headlights because the small current flowing through the resistor 8 is too small to operate the buzzer. Therefore there is no need to shut it off when driving the vehicle in the daytime as only the dim light in lamp 6–A will be produced by the alarm indicating device 6 and this light is only noticeable when it is dark enough to need the headlights on as when darkness falls or when driving in a dark tunnel, or building.

The operation of the headlight reminder alarm system when connected to a motor vehicle as shown in FIGURE 2 is similar to that shown in FIGURE 1. In this case, however, the small current that flows through the resistor 8 and the alarm indicating device 6 also flows through the low oil pressure indicating lamp 9. Also, as shown in FIGURE 2 the two grounding switches may be combined into one oil pressure switch 10 with two circuit terminals, and the resistor 8 is connected directly across these two terminals of the grounding switch 10.

The operation of the headlight reminder alarm system when connected to a motor vehicle as shown in FIGURE 3 is as follows:

When the operator starts the vehicle's motor running an electrical voltage will be generated in the armature 15 of the vehicle's electrical generator and also the grounding switch 12 will open its contacts. A small electrical current will then flow from the armature 15, through resistor 8, alarm indicating device 6, headlights dimmer switch 14, headlight lamps 4 and grounded connections 5 and 16. This small electrical current produces a dim light in the lamp 6–A of the alarm indicating device 6 to remind the operator to turn on the headlights when driving at night.

When the motor is not running and the headlights are left on a large current will flow from the battery 1 through the headlights switch 3, alarm device 6, grounding switch 12 and grounded connections 13 and 2. This large current produces a bright light in lamp 6–A of the alarm indicating device 6 to remind the operator to turn off the vehicle's headlights, whether it is daylight or darkness. If the buzzer 6–B is used, as in FIGURES 8 or 9, the buzzer will sound an alarm in addition to the bright light of lamp 6–A to be sure the operator is reminded to turn off the vehicle's headlights. When the vehicle is operated with its headlights on no alarm will be indicated by device 6 since an equal voltage of the same polarity will be impressed across the alarm circuit.

The operation of the headlight reminder alarm system when connected to a motor vehicle as shown in FIGURE 4 is similar to that shown in FIGURE 3. In this case, however, the small current that flows through the resistor 8 and the alarm indicating device 6 also flows through the generator no-charge indicating lamp 24.

The operation of the headlight reminder alarm system when connected to a motor vehicle as shown in FIGURE 5 is as follows:

When the ignition switch 27 is closed to operate the vehicle's motor a small current will flow from the battery 1 through switch 27, resistor 8 and the grounding switch 12 to the battery return through the grounded connections 13 and 2. When the motor begins to run the grounding switch 12 opens allowing the current from the battery 1 to flow through the ignition switch 27, resistor 8, alarm indicating device 6, headlights dimmer switch 14, headlight lamps 4 and grounded connections 5 and 2. This small current produces a very dim light in lamp 6–A of the alarm device 6 to remind the operator to turn on the headlights, if it is dark enough to need them. When the vehicle is parked with its headlights left on a large current will flow from the battery 1, through the headlights switch 3, alarm indicating device 6, grounding switch 12, which is closed when the motor is turned off, and grounding connections 13 and 2. This larger current flowing through the alarm indicating device 6 produces a bright light in lamp 6–A and operates the buzzer 6–B, if used, to remind the operator to turn off the vehicle's headlights before leaving the parked vehicle.

The operation of the headlight reminder alarm system when connected to a motor vehicle as shown in FIGURE 6 is as follows:

Whenever the vehicle's motor is in operation the switch 37 is in a closed position and current flows from the battery 1 through switch 37, relay coil 20, to the battery again through the grounded connections 21 and 2. This operates the relay armature 22 to an open position allowing a small current to flow from the battery 1, through switch 37, resistor 8, alarm indicating device 6, headlights dimmer switch 14, headlight lamps 4, to battery 1 again through the grounded connections 5 and 2. This small current produces a dim light in lamp 6–A of the alarm device 6 to remind the vehicle operator to turn on the headlights, if it is dark enough to need them.

When the motor is turned off the switch 37 will be in an open position and the relay armature 22 will be in a closed switch position. If the headlights switch 3 is in a closed position a large current will then flow from the battery 1 through the headlights switch 3, alarm indicating device 6, relay switch 22 to the battery 1 through grounded connections 23 and 2. This large current flowing through the alarm indicating device 6 produces a bright light in lamp 6–A, and operates the buzzer 6–B, if used, to remind the operator to turn off the vehicle's headlights, whether it is at night or in bright daylight.

If desired, the current limiting resistor 8 may consist, in whole or in part, of the low oil pressure lamp of the motor vehicle, FIGURES 4 and 5.

I claim:

1. A headlight reminder alarm system for a motor vehicle comprising the electrical battery and accessory circuit switch of said vehicle, a current limiting electrical resistor, an alarm indicating device, an automatic alarm switch provided with self-closing switch contacts automatically operable to an open position when the motor of said vehicle is in operation, the headlights switch, headlights high and low beam selector switch and headlight lamps of said motor vehicle; said current limiting electrical resistor and said alarm indicating device connected between said accessory circuit switch and said vehicle headlights high and low beam selector switch and in electrical series circuit with said battery, accessory hicle headlights high and low beam selector switch and headlight lamps whereby said alarm indicating device is made operative when said vehicle accessory circuit switch is closed and said automatic alarm switch and said headlights switch are both open, to remind the operator of said vehicle to turn on the headlights when driving at night; said automatic alarm switch connected between the grounded frame of said motor vehicle and said alarm indicating device and in electrical series circuit with said battery, headlights switch and alarm indicating device whereby said alarm indicating device is also made operative when said vehicle headlights switch and said automatic alarm switch are both in a closed position, to remind the operator of said vehicle to turn off the headlights if the vehicle is parked with its headlights left on; circuit means included in said circuits whereby said alarm indicating device is made inoperative when said accessory circuit switch and said headlights switch are both closed and said automatic alarm switch is open.

2. A headlight reminder alarm system for a motor vehicle comprising the electrical battery and main accessory circuit switch of said vehicle, a current limiting electrical resistor, an alarm indicating device, an automatic alarm switch provided with self-closing switch contacts automatically operable to an open position when the motor of said vehicle is in operation, the headlights switch, headlights high and low beam selector switch and headlight lamps of said motor vehicle; said current limiting electrical resistor and said alarm indicating device connected in electrical series circuit between said main accessory circuit switch and said headlights switch; said automatic alarm switch connected between the grounded return of said vehicle battery and said alarm indicating device; an alarm indicating circuit comprising said electrical battery, main accessory circuit switch, current limiting electrical resistor, alarm indicating device, headlights high and low beam selector switch and headlight lamps whereby said alarm indicating device is made operative when said main accessory circuit switch is closed and said automatic alarm switch and said headlights switch are both open, to remind the vehicle operator to turn on the headlights when driving at night; a second alarm indicating circuit comprising said vehicle electrical battery, headlights switch, alarm indicating device and automatic alarm switch whereby said alarm indicating device is made operative when said headlights switch and said automatic alarm switch are both closed, to remind the vehicle operator to turn off the headlights when the vehicle motor is not in operation; circuit means provided in said circuits whereby said alarm device is made inoperative when said main accessory circuit switch and said headlights switch are both closed and said automatic alarm switch is open.

3. A headlight reminder alarm indicating device for a motor vehicle provided with an electrical battery, a main accessory circuit switch, a headlights switch and headlight lamps; said alarm indicating device comprising a current limiting electrical resistor, a pilot lamp and a grounded automatic alarm switch with self-closing switch contacts automatically operable to an open position when the motor of said vehicle is in operation, said alarm indicating device connected between the main accessory circuit switch and the headlights switch of said vehicle; an alarm indicating series circuit comprising the electrical battery and main accessory circuit switch of said motor vehicle, said electrical resistor, pilot lamp and headlight lamps of said motor vehicle whereby said pilot lamp is made operative when said main accessory circuit switch is closed, the motor of said vehicle is in operation and said vehicle headlights switch is open, to remind the vehicle operator to turn on the headlights when driving at night; an alarm indicating series circuit comprising said electrical battery, headlights switch, pilot lamp and grounded automatic alarm switch whereby said pilot lamp is made operative when both said headlights switch and said automatic alarm switch are closed, to remind the vehicle operator to turn off the headlights when the vehicle motor is not in operation; circuit means provided in said circuits whereby said pilot lamp is made inoperable when both said headlights switch and said main accessory circuit switch are closed and said grounded automatic alarm switch is open.

4. A headlight reminder alarm indicating device for a motor vehicle provided with an electrical battery, a main accessory circuit switch, a headlight circuit switch and headlight lamps, comprising a grounded alarm switch with self-closing switch contacts automatically operable to an open position when the motor of said vehicle is in operation, a current limiting electrical resistor and a pilot lamp connected in the electrical system of said vehicle between the main accessory circuit switch and the headlight lamps of said vehicle; an alarm indicating series circuit comprising said electrical battery, main accessory circuit switch, current limiting electrical resistor, pilot lamp and headlight lamps; a second alarm indicating circuit comprising said electrical battery, headlights switch, pilot lamp and grounded automatic alarm switch; circuit means provided in said circuits whereby a relatively dim light is produced in said pilot lamp when said main accessory circuit switch is closed and said grounded automatic alarm switch and said headlights switch are both open, to indicate an alarm when the motor vehicle is operated at night with its headlights turned off; circuit means also provided in said circuits whereby a relatively bright light is produced in said pilot lamp when said headlights switch and said grounded alarm switch are both closed, to indicate an alarm when the headlights are left on, in either daylight or darkness, and the motor of said vehicle is not in operation; circuit means included in said circuits whereby said pilot lamp is made inoperative when said headlights switch and said main accessory circuit switch are both closed and said grounded automatic alarm switch is open.

References Cited in the file of this patent

UNITED STATES PATENTS

| | | |
|---|---|---|
| 2,598,056 | Hollins | May 27, 1952 |
| 2,696,607 | Witkins | Dec. 7, 1954 |
| 2,722,673 | Turner | Nov. 1, 1955 |
| 2,724,101 | Hallman | Nov. 15, 1955 |
| 2,729,806 | Dewhirst | Jan. 3, 1956 |
| 2,759,176 | Kennedy | Apr. 14, 1956 |
| 2,788,514 | Schmitt | Apr. 9, 1957 |
| 2,820,215 | Hughes | Jan. 14, 1958 |
| 2,824,293 | Meinhardt | Feb. 18, 1958 |